United States Patent [19]

Taenzer

[11] Patent Number: 4,794,286

[45] Date of Patent: Dec. 27, 1988

[54] VARIABLE RELUCTANCE STEPPER MOTOR

[75] Inventor: Jon C. Taenzer, Palo Alto, Calif.

[73] Assignee: Adept Technology, Inc., Sunnyvale, Calif.

[21] Appl. No.: 113,332

[22] Filed: Oct. 23, 1987

Related U.S. Application Data

[63] Continuation of Ser. No. 847,730, Apr. 3, 1986, abandoned.

[51] Int. Cl.$^4$ ............................................. H02K 41/00
[52] U.S. Cl. ..................................... 310/12; 310/168; 310/49 R; 310/162; 310/266; 310/268
[58] Field of Search ............... 310/12, 49 R, 162–164, 310/168, 266, 268

[56] References Cited

U.S. PATENT DOCUMENTS

| | | |
|---|---|---|
| 1,227,185 | 5/1917 | Neuland . |
| 2,627,040 | 1/1953 | Hansen . |
| 3,140,413 | 7/1964 | Terry et al. ..................... 310/168 |
| 3,157,810 | 1/1964 | Adkins ............................... 310/168 |
| 3,392,293 | 7/1968 | De Bbo et al. . |
| 3,509,392 | 4/1970 | Snowdon . |
| 3,535,604 | 10/1970 | Madsen et al. . |
| 3,629,626 | 12/1971 | Abbott . |
| 3,867,676 | 2/1975 | Chai et al. . |
| 4,029,977 | 6/1977 | Chai et al. . |
| 4,190,779 | 2/1980 | Schaeffer . |
| 4,207,483 | 6/1980 | Baer . |
| 4,286,180 | 8/1987 | Langley ............................... 310/12 |
| 4,288,709 | 9/1981 | Matthias et al. . |
| 4,315,171 | 2/1982 | Schaeffer . |
| 4,385,250 | 5/1983 | Welburn . |
| 4,458,168 | 7/1984 | Welburn . |
| 4,461,994 | 7/1984 | MacDonald .................... 310/168 X |
| 4,501,980 | 2/1988 | Welburn ................................ 310/12 |

FOREIGN PATENT DOCUMENTS

| | | |
|---|---|---|
| 2822830 | 11/1979 | Fed. Rep. of Germany . |
| 2150513 | 4/1978 | France . |
| 2395633 | 6/1983 | France . |
| 5029211 | 7/1975 | Japan . |
| 162716 | 4/1921 | United Kingdom . |
| 1556404 | 11/1979 | United Kingdom . |

OTHER PUBLICATIONS

Thompson, "Linear Incremental Motor", *IBM Tech Disclosure Bulletin*, vol. 6, No. 9, 2/64.
"Stepping Motor", J. T. Wilson, III, IBM Tech. Disclosure Bulletin, vol. 15, No. 1, Jul. 1972, pp. 568–569.
"Ultra High Torque Motor System for Direct Drive Robotics", by Ross Welburn, Motor-Con Apr. 1984 Proceedings, pp. 17–24.

*Primary Examiner*—Mark O. Budd
*Attorney, Agent, or Firm*—Flehr, Hohbach, Test, Albritton & Herbert

[57] ABSTRACT

The invention is a variable reluctance motor using a stator comprised of a plurality of single tooth poles, wound so that every other pole of the same phase is of oppposite polarity. A movable member is also provided with a plurality of single tooth pole members. The spacing of rotor and stator poles is equal.

14 Claims, 4 Drawing Sheets

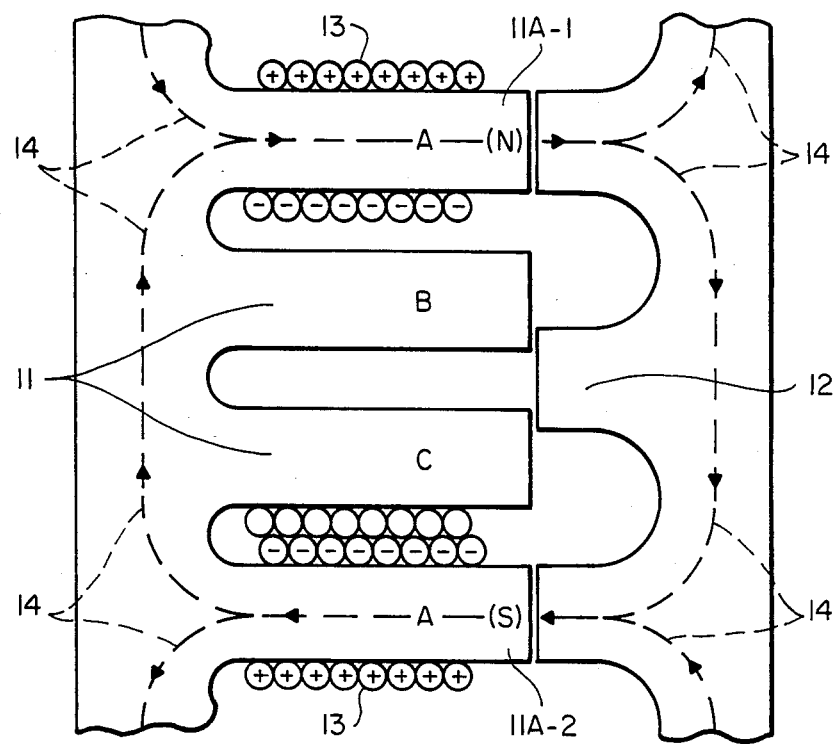
FIG_1
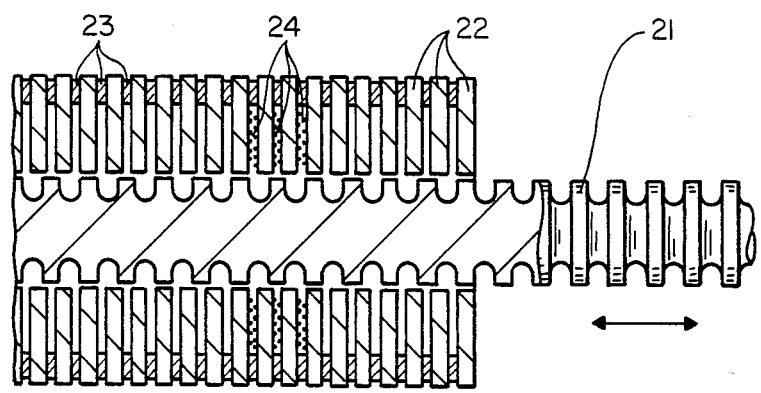
FIG_3

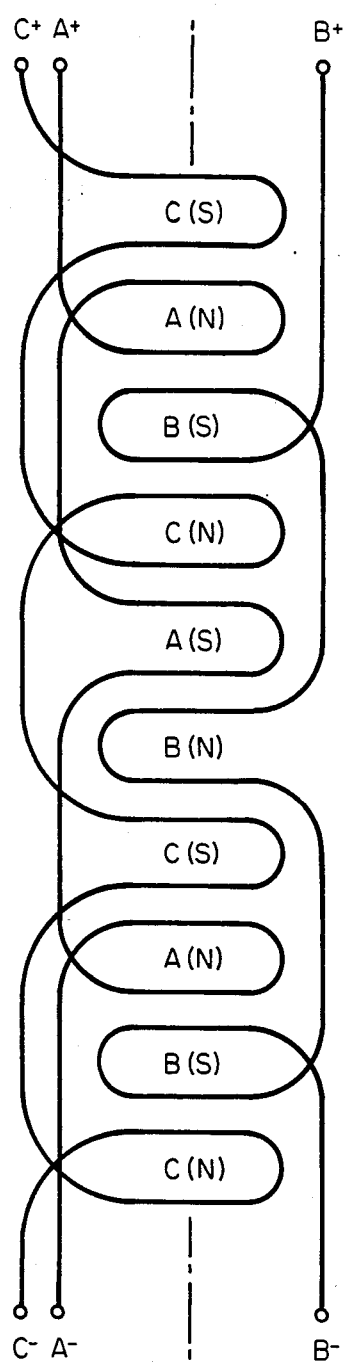
FIG_2
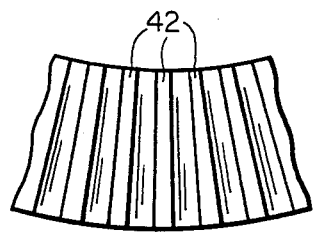
FIG_8
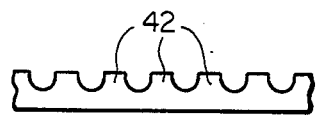
FIG_9
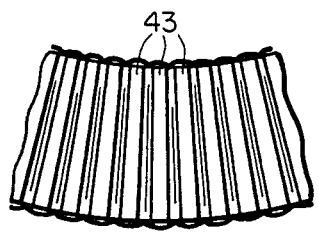
FIG_10
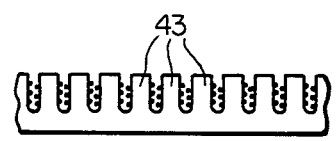
FIG_11

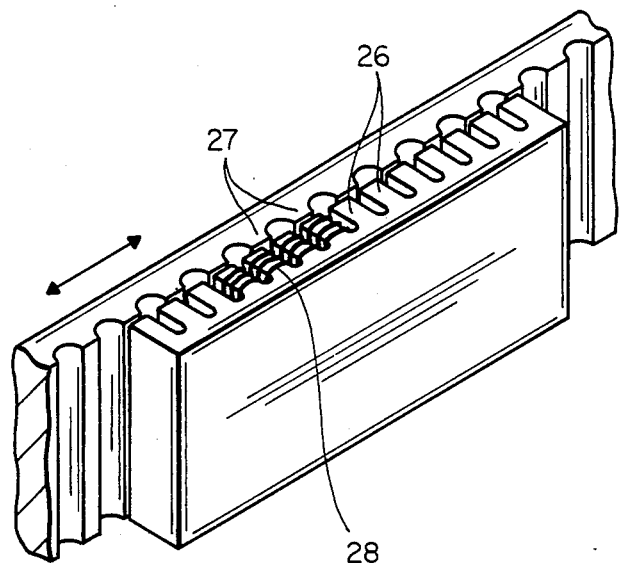
FIG_4
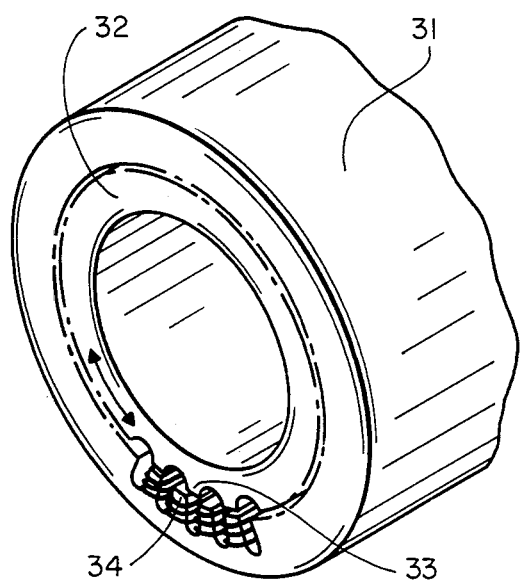
FIG_5

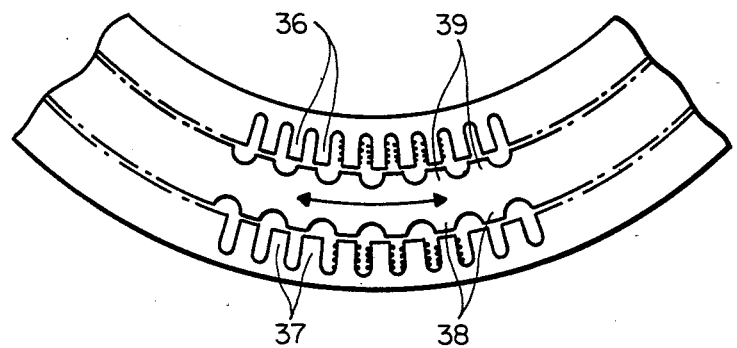
FIG_6
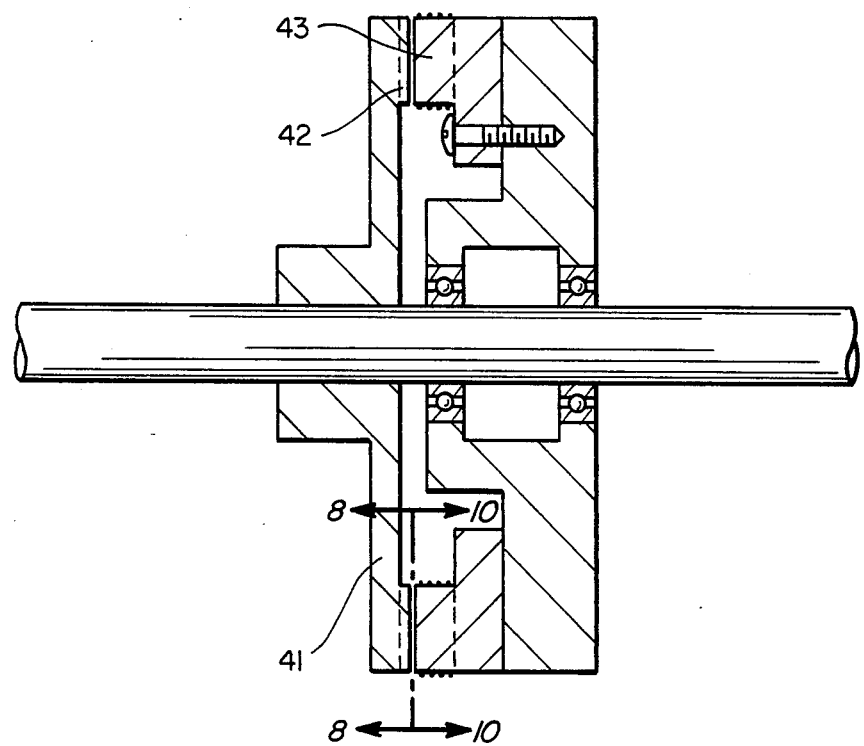
FIG_7

VARIABLE RELUCTANCE STEPPER MOTOR

This is a continuation of application Ser. No. 847,730, filed Apr. 3, 1986, now abandoned.

BACKGROUND OF THE INVENTION

The present invention relates generally to variable reluctance motors and more particularly to a variable reluctance high torque stepper motor.

Variable reluctance stepper motors include a stator or stators made up of laminations of magnetic material such as soft iron having a number of poles with inductive windings wound on the poles and a movable member of laminated magnetic material, generally a rotor, having poles which cooperate with the stator poles to provide low reluctance magnetic paths for the magnetic flux generated by the stator winding. Movement of the movable member is controlled by cyclically and sequentially energizing the stator winding to provide a moving flux. The movable member assumes successive positions of least reluctance for the magnetic field and moves with the flux. Motors of this type obtain maximum efficiency and torque when the reluctance at the stable holding position is minimized.

High efficiency, high torque motors are particularly useful in connection with robotics, process and fabrication equipment, positioning tables and other applications where accurate positioning and high linear or rotary forces are required at relatively low speeds.

OBJECT AND SUMMARY OF THE INVENTION

It is an object of the present invention to provide an improved variable reluctance stepper motor.

It is another object of the present invention to provide a variable reluctance stepper motor for directly driving loads such is robotic heads, process and fabrication equipment, positioning tables and the like. It is another object of the present invention to provide a variable reluctance motor with short low reluctance magnetic paths and high utilization of the magnetic poles of the rotor.

It is another object of the invention to provide a multiphase variable reluctance motor with multiple stator poles for every two rotor poles wherein many short magnetic circuits are formed in a pattern which repeats. For example, in a three-phase variable reluctance motor of this design, many short magnetic circuits are formed in a pattern which repeats every four rotor poles or six stator poles.

It is another object of the invention to provide a motor which can be configured as a single stator and single rotor with either inside or outside stator; a three-part unit with both inside and outside stators; a pancake motor with dish-shaped rotor and one or two stators, or a linear motor with one or more stators.

There is provided a variable reluctance motor comprising a stator and a movable member; said stator including a plurality of equally spaced stator poles, windings on each of said stator poles for magnetizing the stator poles so that every other stator pole of the same phase is of opposite polarity; said movable member including a plurality of equally spaced member poles positioned to cooperate with the stator poles, said member poles being spaced so that the spacing between alternate member poles is equal to the spacing between adjacent stator poles of the same phase whereby the member poles can align with the stator poles of opposite polarity to provide a low reluctance flux path from one stator pole to the adjacent stator pole of opposite polarity.

BRIEF DESCRIPTION OF THE DRAWINGS

The foregoing and other objects of the invention will be more clearly understood from the following description taken in conjunction with the accompanying drawings, in which:

FIG. 1 is a partial view of a motor in accordance with the invention.

FIG. 2 is a schematic view showing the stator pole windings for a three-phase motor.

FIG. 3 shows a cylindrical linear motor, in accordance with the invention.

FIG. 4 shows a single stator linear motor in accordance with the invention.

FIG. 5 shows a rotary motor with one stator on the outside of the rotor.

FIG. 6 shows a dual stator version of the motor of FIG. 5.

FIG. 7 shows a single stator pancake version of the motor.

FIG. 8 is an enlarged view taken along the line 8—8 of FIG. 7.

FIG. 9 is a side elevational view of the portion shown in FIG. 8.

FIG. 10 is an enlarged view taken along the line 10—10 of FIG. 7.

FIG. 11 is a side elevational view of FIG. 10.

DETAILED DESCRIPTION

FIG. 1 shows a portion of a motor in accordance with the invention. Four stator poles 11 and three rotor poles 12 are shown. Phase A is energized by applying current to the windings 13 wound on the poles 11A-1 and 11A-2. It is seen that there is a low reluctance path for the magnetic flux 14 through the stator and through alternate poles of the rotor from one energized stator pole 11A-1 to the next adjacent energized stator pole 11A-2 of the same phase but opposite polarity. Every third stator pole is energized by a coil connected in series with the coil of all other poles of that phase to form a phase winding. In FIG. 1 the poles forming Phase A are shown with their respective coils. Half of the coils wound on the Phase C poles are also shown to indicate how adjacent coils would be placed. The coils associated with the other poles have been omitted for clarity. When Phase A is energized, every other Phase A pole is of north magnetic polarity and the rest of the Phase A poles are of south magnetic polarity as shown in FIG. 1. This makes the magnetic circuits short and thus reduces the magnetic reluctance of each magnetic circuit. The result of low reluctance is a strong magnetic field strength for a given magneto motive force (MMF), i.e., better efficiency. The magnetic circuits with Phase A energized are indicated by the dash lines in FIG. 1.

To produce the alternating pole polarity for each phase, the motor is wound with coils of alternating sense. Thus, when Phase A is energized, the upper pole shown in FIG. 1 would have current flowing clockwise in that Phase A coil when viewed from the rotor end of the coil. The lower pole in FIG. 1 has current flowing counter clockwise. This is shown by the dots of current entering the wire and the plus symbol for current exiting the wire. Adjacent poles of the same phase are of opposite magnetic polarity.

To achieve this alternating polarity, the coils are wound as schematically shown in FIG. 2, where the coils are viewed from the rotor end and only one turn per coil is shown for clarity. Thus, for example, the coil on the first pole of Phase A is wound counter-clockwise while the coil on the next pole is wound clockwise. This makes every other pole of each phase of the same polarity. Similarly, the upper pole for Phase C is wound clockwise, the next is counter-clockwise, etc. Phase B is likewise wound with consecutive poles of alternate sense.

The operation of the motor requires that the phases be energized sequentially.. Referring to FIG. 1, it is assumed that Phase A of the motor is energized as shown in FIG. 1. The rotor poles line up exactly with Phase A poles of the stator providing low relectance. If Phase A is then deenergized and Phase B energized, the rotor will be driven upward as the middle pole of.the rotor.tries to align.with the Phase B stator pole. hhen the rotor has moved to that point, the lower rotor pole will be midway between the Phase C stator pole and the lower Phase A stator pole. Phase B is then deenergized and Phase C energized; the rotor will again be driven upwards until alignment of the lower rotor pole with Phase C stator pole is achieved. Phase C is then deenergized, Phase A again energized and the rotor will continue to be driven upward until alignment of the middle rotor pole with the upper Phase A pole is achieved. At this time the rotor will have moved one rotor pole in position. The above described sequence is then repeated. Electronic drive circuits for sequentially energizing the phase windings are known in the art.

FIG. 3 shows a cylindrical linear motor. The driven or movable member is a grooved rod 21 shown partly in section. The stator is composed of a stack of steel washers 22 with steel spacers 23 and pancake windings 24 between the washers. Operation of the motor for linear motion is as described with reference to FIGS. 1 and 2 with successive phases being sequentially energized and deenergized whereby to provide a force which causes the movable member to move and align its poles with the poles of adjacent energized Phase A, B or C stator poles. FIG. 4 is a perspective view of a single stator linear motor of rectilinear configuration. The movable member and stator are formed of a plurality of stacked laminations which are stamped and assembled to form a plurality of spaced stator and movable member poles 26, 27. Windings 28 are provided on the stator and energized in the manner described with respect to FIG. 1 whereby to cause the linear member to move in a given direction depending upon the energization of the series connected three-phase windings. By forming poles on the rear of the movable members and using a second stator similar to the one shown, twice the force can be generated. If the movable member were a hollow or solid triangle or of square cross-section, then three or four stators could be used respectively to cooperate with the facing poles of the movable member and the force could be further increased. This, of course, could be continued to eventually become a full circular motor such as the one shown in FIG. 3.

FIG. 5 shows a rotary motor composed of stacked laminations with one stator 31 on the outside of the rotor 32. The motor is cylindrically symmetrical and can be of any length or diameter to provide additional torque. Although the poles 33 in the rotor and 34 in the stator completely encircle their respective parts, only a few poles are shown for clarity. A single stator configuration with inside stator and outside rotor can also be constructed. FIG. 6 shows a small segment of a similar motor with a dual stator having poles 36 and 37 and a rotor having outwardly and inwardly facing poles 38 and 39, cooperating with the stator poles.

FIG. 7 shows a single stator pancake version of the motor. Here again, a dual stator version with pancake rotor between can be constructed. More particularly, the pancake motor of FIG. 7 includes a rotor 41 having rotor poles 42 shown in FIGS. 8 and 9 and a stator having wound rotor poles 43 as shown in FIGS. 10 and 11.

What is claimed:

1. A variable reluctance motor comprising a stator and a movable member
   said stator including a plurality of equally spaced teeth each tooth forming a stator pole to provide a plurality of single tooth stator poles
   windings on each of said stator poles for magnetizing the stator poles so that every other stator pole of the same phase is of opposite polarity
   said movable member including a plurality of equally spaced movable member teeth each tooth forming a member pole to provide a plurality of single tooth member poles, member poles positioned to cooperate with the stator poles, said movable member poles being spaced so that the spacing between alternate movable member poles is equal to the spacing between stator poles of the same phase and opposite polarity whereby the member poles can align with the stator poles of opposite polarity to provide a low reluctance flux path through the movable member from one stator pole to the adjacent stator pole of opposite polarity.

2. A variable reluctance motor as in claim 1 wherein the stator is a linear member and the movable member is a linear member which moves along a straight line.

3. A variable reluctance motor as in claim 2 wherein the stator is a cylindrical member and the movable member is a rod surrounded by the cylindrical member.

4. A variable reluctance motor as in claim 1 in which the stator is a cylindrical member and the movable member is a rotor adapted to rotate with respect to the stator.

5. A variable reluctance motor as in claim 1 in which the stator comprises outer and inner cylindrical members with inwardly and outwardly facing poles and said movable member is a rotor disposed between said outer and inner stator cylindrical members with outwardly and inwardly facing poles cooperating with the outer and inner stator poles.

6. A variable reluctance motor as in claim 1 in which said stator is a pancake stator with axially extending stator poles and said movable member is a pancake member with axially extending stator poles cooperating with the rotor poles.

7. A variable reluctance motor as in claim 1 which includes a pair of linear stators with poles facing each other and said movable member is disposed between said stators and includes poles extending axially from each side in cooperation with the stator poles.

8. A variable reluctance motor comprising a stator and a movable member
   said stator including a plurality of equally spaced teeth each tooth forming a stator pole to provide a plurality of single tooth stator poles
   three phase windings with winding of each phase wound on every third stator pole with alternating winding sense for magnetizing the stator poles so that every other stator pole of the same phase is of opposite polarity said movable member including a polurality of equally spaced movable member teeth each tooth forming a member pole to provide a plurality of single tooth member poles, said member poles positioned to cooperate with the stator poles, said movable member poles being spaced so that the spacing between alternate movable member poles is equal to the spacing between stator poles of the same phase and opposite polarity whereby the member poles can align wiwth the stator poles of opposite polarity to provide a low reluctance flux path through the movable member from one stator pole to the adjacent stator pole of opposite polarity.

9. A variable reluctance motor as in claim 8 wherein the stator is a linear member and the movable member is a linear member which moves along a straight line.

10. A variable reluctance motor as in claim 8 wherein the stator is a cylindrical member and the movable member is a rod surrounded by the cylindrical member.

11. A variable reluctance motor as in claim 8 in which the stator is a cylindrical member and the movable member is a rotor adapted to rotate with respect to the stator.

12. A variable reluctance motor as in claim 8 in which the stator comprises outer and inner cylindrical members with inwardly and outwardly facing poles and said movable member is a rotor disposed between said outer and inner stator cylindrical members with outwardly and inwardly facing poles cooperating with the outer and inner stator poles.

13. A variable reluctance motor as in claim 8 in which said stator is a pancake stator with axially extending stator poles and said movable member is a pancake member with axially extending stator poles cooperating with the rotor poles.

14. A variable reluctance motor as in claim 13 which includes a pair of stators with poles facing each other and said movable member is disposed between said stators and includes poles extending axially from each side in cooperation with the stator poles.

* * * * *